Dec. 21, 1965  G. F. SCHIMKAT  3,224,198
HYDROSTATIC MACHINE
Filed Dec. 23, 1964  3 Sheets-Sheet 1

INVENTOR.
GERHARD FRANZ SCHIMKAT
BY
his attorney

Dec. 21, 1965  G. F. SCHIMKAT  3,224,198
HYDROSTATIC MACHINE
Filed Dec. 23, 1964  3 Sheets-Sheet 2

INVENTOR.
GERHARD FRANZ SCHIMKAT

INVENTOR.
GERHARD FRANZ SCHIMKAT

United States Patent Office 3,224,198
Patented Dec. 21, 1965

3,224,198
HYDROSTATIC MACHINE
Gerhard Franz Schimkat, Scholzplatz 7, Berlin,
Charlottenburg, Germany
Filed Dec. 23, 1964, Ser. No. 420,828
20 Claims. (Cl. 60—53)

The present invention relates to hydraulic machines in general, and more particularly to a hydrostatic machine. Still more particularly, the invention relates to a hydrostatic machine which is especially suited for use as an infinitely variable speed transmission to transmit rotary motion from an input member to an output member.

It is already known to combine two hydraulic machines in such a way that one thereof acts as a pump and the other acts as a motor. The pump delivers to the motor oil or another suitable liquid pressure medium and the motor converts hydrostatic energy into mechanical energy which is used to drive a working machine. At the same time, the machine will effect necessary changes in r.p.m. and torque so that the working machine is driven at a requisite speed and with requisite power.

A serious drawback of conventional hydrostatic machines of this general character is low efficiency. Also, the machines are quite expensive, bulky, heavy and difficult to operate. Consequently, such machines failed to gain widespread acceptance by the public, not only in the automobile industry but in machine industry in general.

Accordingly, it is an important object of the present invention to provide a very simple, inexpensive, exceptionally compact and highly versatile hydrostatic machine which can be utilized in many industries including the production of automobiles, airplanes, machine tools and many others.

Another object of the invention is to provide a very compact hydrostatic machine which operates with an exceptionally high degree of efficiency, which is of lightweight construction, and which can be readily adapted for a number of different uses in a simple and economical way.

A further object of the invention is to provide a very simple, compact and reliable shifting mechanism for a variable speed transmission which is constructed and assembled in accordance with my invention.

An additional object of the invention is to provide a reversible hydrostatic machine wherein the r.p.m. of the output member may be varied infinitely and within a very wide range, wherein losses due to leakage are negligible, and which can be used in many fields wherein conventional hydrostatic machines failed to gain acceptance due to excessive bulkiness, overweight, excessive cost or for other reasons.

Still another object of the invention is to provide a hydrostatic transmission whose shifting mechanism may be operated with a minimum of effort, which is always ready for immediate use, and wherein all of the moving parts may be accommodated in a single housing so that the prevention of leakage presents small problems.

A concomitant object of the invention is to provide a duel pump which may be utilized in the hydrostatic machine of my invention and to construct the pump in such a way that it comprises a minimum of different parts.

Another object of the invention is to provide a novel system of pressure equalizing ducts, bores and other passages which may be applied in a hydrostatic transmission of the above outlined characteristics.

Briefly stated, one feature of my invention resides in the provision of a hydrostatic machine which is preferably utilized as an infinitely variable speed transmission and comprises a single housing for two mirror symmetrical internal-gear-type rotary pumps one of which functions as a motor and is driven by the other thereof. Each pump defines with the housing an arcuate working chamber and each comprises an axially movable rotor member provided with a plurality of axially parallel pistons extending into and arranged to orbit in the respective working chamber. By moving the rotor members axially and as a unit, the pistons of one rotor member will penetrate deeper into the respective working chamber while the pistons of the other rotor member will be withdrawn to the same extent from their working chamber. In this manner, the machine changes the speed ratio between the two rotor members and the input and output shafts which are respectively provided to drive the rotor member of the one pump.

The means for effecting axial movements of the rotor members may comprise an axially movable bottom wall which is disposed between the two working chambers and which is adjustable by a mechanism extending from the housing. The pistons abut against the opposite sides of the bottom wall and are biased thereagainst by springs and/or by hydraulic fluid which may leak from the respective working chambers. In order to facilitate axial displacements of the bottom wall, I prefer to provide pressure equalizing ducts connecting such sections of the two working chambers which are maintained at identical or substantially identical pressure.

The novel features which are considered as characteristic of the invention are set forth in particular in the appended claims. The improved hydrostatic machine itself, however, both as to its construction and its mode of operation, together with additional features and advantages thereof, will be best understood upon perusal of the following detailed description of certain specific embodiments with reference to the accompanying drawings, in which:

Figure 1:
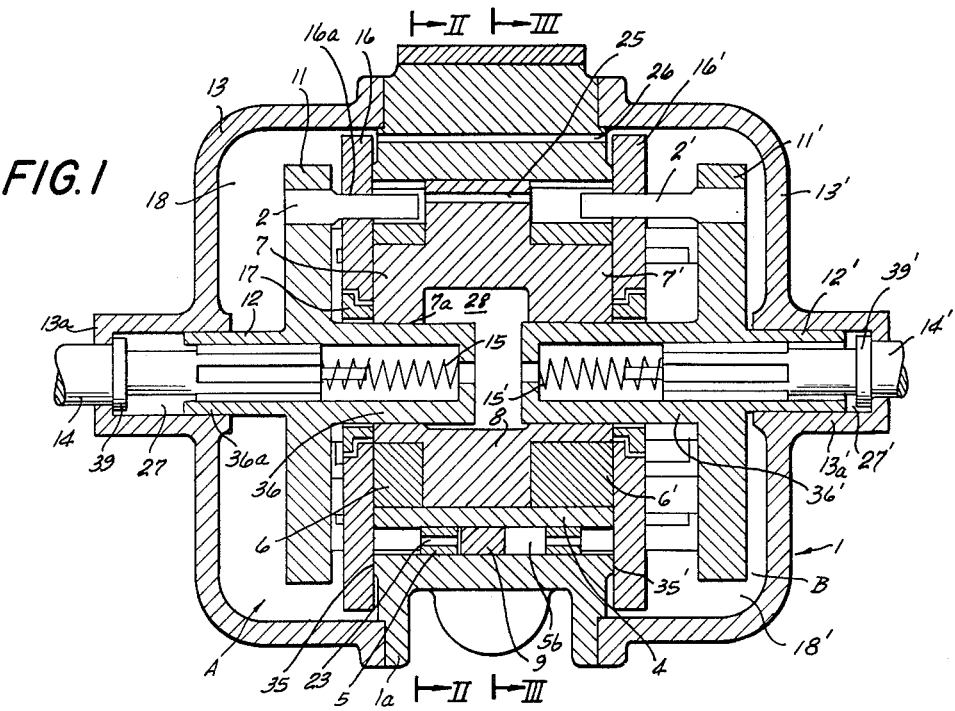
FIG. 1 is an axial section through a hydrostatic machine which is constructed in accordance with a first embodiment of my invention and which is used as a variable speed transmission.
Figure 2:
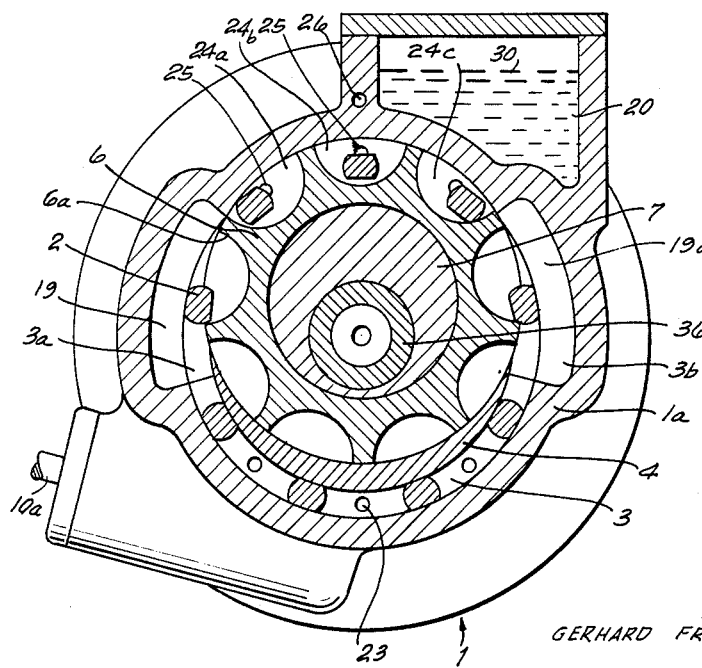
FIG. 2 is a transverse section substantially as seen in the direction of arrows from the line II—II of FIG. 1.
Figure 3:
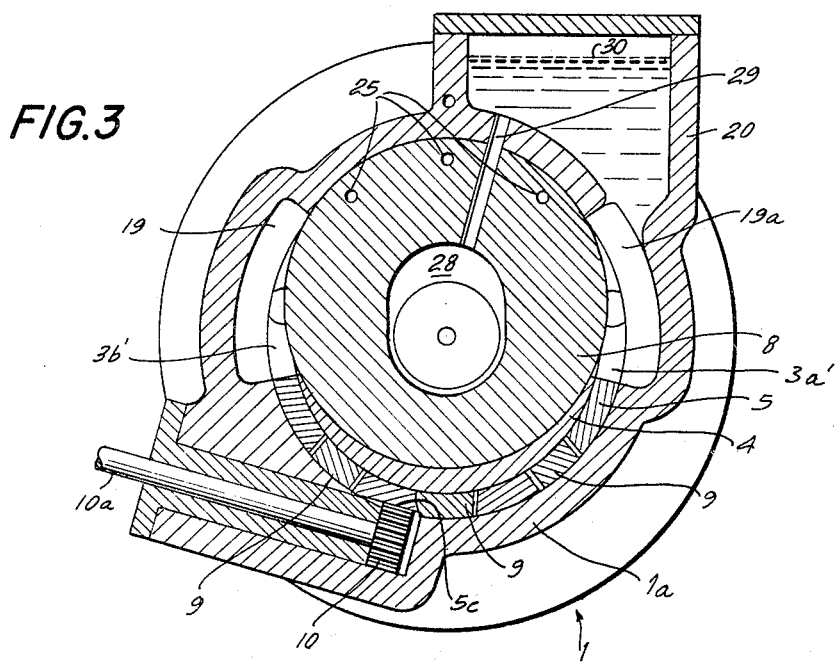
FIG. 3 is another transverse section as seen in the direction of arrows from the line III—III of FIG. 1.

The hydrostatic machine of FIGS. 1 to 3 comprises a single housing or stator 1 which accommodates a hydraulic pump A and a hydraulic motor B. The parts of the motor B are mirror symmetrical to the parts of the pump A. These two units resemble two internal-geartype rotary pumps and are constructed substantially as disclosed in my copending application Serial No. 416,564 filed Dec. 7, 1964, entitled Rotary Piston Pump.

The pump A comprises a series of annularly arranged parallel pistons 2 which are connected with a disk-shaped rotor 11 and travel in an arcuate working chamber 3 defined by the mantle 1a of the housing 1, by a crescent-shaped partition 4, and by an axially movable bottom wall 5. The axis of the rotor 11 coincides with the axis of the mantle 1a and is parallel to the axis of a free-running gear 6 mounted on a shaft 7 which is secured to or integral with a fixed base 8. The axis of the gear 6 is located within the path in which the pistons 2 rotate about the axis of the rotor 11. The parts 1a, 4, 7 and 8 form a rigid unit which also includes spacer elements 9 extending into the bottom wall 5. The parts 2', 3', 6', 7', 11' of the motor B are mirror symmetrical with reference to the corresponding parts of the pump A, i.e., the two units are accommodated in a common housing 1 to form a compact machine.

Figure 4:
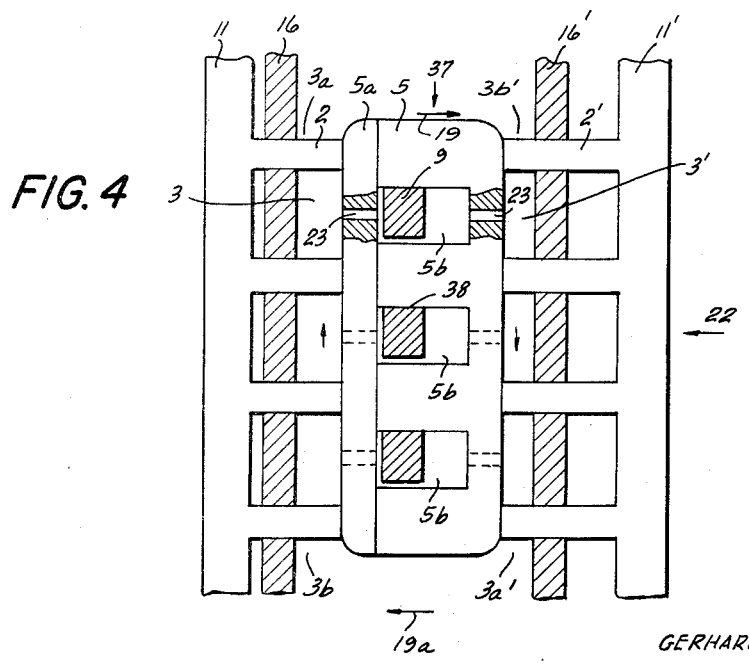
FIG. 4 is a fragmentary developed view of certain parts in the single housing of the machine shown in FIGS. 1–3.

FIG. 4 shows the bottom wall 5 in a developed view, and it will be seen that this bottom wall defines three recesses 5b for the spacer elements 9. Each spacer element 9 is received in the corresponding recess 5b in such a way that the bottom wall 5 is free to move axially with reference thereto. In order to facilitate the assembly of the machine, the bottom wall 5 preferably comprises a detachable plate-like portion 5a which allows for insertion of spacer elements 9 into the corresponding recesses 5b or, better to say, the portion 5a is detached when the remainder of the bottom wall 5 is inserted into the housing 1 to take the position shown in FIG. 1. The means for detachably securing the portion 5a to the remainder of the bottom wall 5 includes screws, bolts or similar fasteners, not shown in the drawings.

The means for adjusting the axial position of the bottom wall 5 includes a pinion 10 mounted on a shaft 10a and meshing with a rack 5c on the periphery of the bottom wall. The shaft 10a may be rotated by a handwheel or by a suitable servomotor, not shown.

The rotor 11 is fixed to a coaxial shaft 12 one end portion 36 of which is slidable in a bore 7a provided in the shaft 7 of the gear 6. The other end portion 36a of the shaft 12 is slidable in a hub 13a forming part of a cover 13 which in turn forms part of the housing 1 and is detachably but sealingly fixed to the mantle 1a. The shaft 12 is hollow and is formed with axially extending internal grooves which receive complementary splines provided on a rotary drive shaft or input shaft 14 journalled in the hub 13a. The shaft 14 is driven by an electric motor or the like, not shown. The interior of the hollow shaft 12 accommodates a helical expansion spring 15 which presses the end faces of the pistons 2 against the corresponding side of the bottom wall 5 and simultaneously holds a collar 39 of the drive shaft 14 in sealing abutment with an internal shoulder of the hub 13a.

A disk-shaped annular valve member 16 which is interposed between the rotor 11 and gear 6 is provided with bores 16a through which the pistons 2 extend into the spaces between the teeth of the gear 6 and into the working chamber 3. The valve member 16 is movable in the axial direction of the rotor 11 but such axial movements are limited by a retaining ring 17 which is fixedly secured to the shaft 7 of the gear 6. When the valve member 16 moves away from the gear 6, its right-hand end face (as viewed in FIG. 1) defines with the mantle 1a an annular gap 35 which allows liquid pressure medium to flow between the spaces of teeth 6a and the working chamber 3 on the one hand, and the internal compartment 18 of the cover 13 on the other hand. When the pump A is in operation, the compartment 18 is filled with oil or another suitable liquid pressure medium. Such pressure medium escapes from the working chamber 3 by flowing through the annular gap 35 whereby the end faces of the valve member 16 are subjected to hydraulic pressure which keeps the valve member at a certain distance from the mantle 1a, i.e., when the pressures at the opposite sides of the valve member 16 are balanced, the width of the gap 35 is less than the maximum width.

The corresponding parts of the motor B are assembled in similar fashion and are identified by similar reference numerals each followed by a prime.

The housing 1 is formed with channels 19 and 19a. The channel 19a conveys liquid from the liquid-discharging portion 3a' of the working chamber 3' to the liquid-receiving portion 3b of the working chamber 3, and the channel 19 connects the liquid-discharging portion 3a of the working chamber 3 with the liquid-receiving portion 3b' of the working chamber 3', see FIG. 4. The portions 3a'3b and 3a'3b' of each chamber are respectively spaced and sealed from each other. The channel 19a also communicates with a source of supply here shown as an oil reservoir 20.

FIG. 1 shows the pistons 2 in their inner end positions in which they displace a maximum quantity of liquid during each revolution of the rotor 11. The pistons 2' are shown in their outer end positions in which they displace a minimum quantity of liquid during each revolution of the rotor 11'. Consequently, when the rotor 11 rotates at the speed of the drive shaft 14, the rotor 11' is driven at a maximum speed which substantially exceeds the r.p.m. of the shaft 14. This will be readily understood since the pistons 2' displace less fluid than the pistons 2 whereby the machine performs the function of a step-up transmission because the ouput shaft 14' rotates at a speed exceeding the speed of the drive shaft 14. Inversely, when the pistons 2 are moved to their outer end positions in which the pump A displaces less liquid per revolution of the rotor 11, the pistons 2' move to their inner end positions and the machine will operate as a step-down transmission because the r.p.m. of the output shaft 14' will be less than the r.p.m. of the drive shaft 14 or, at least, less than the maximum possible speed of the output shaft. The speed ratio of the machine may be varied by the pinion 10 which effects axial displacements of the bottom wall 5 to thereby move the pistons 2, 2' between their inner and outer end positions, always in such a way that the pistons 2 move to their inner end positions when the pistons 2' assume their outer end positions and vice versa. Each set of pistons may be held in an infinite number of intermediate positions so that the machine actually constitutes an infinitely variable speed transmission whose speed ratio is changed in response to rotation of the shaft 10a. When the bottom wall 5 is shifted in a direction to the left, as viewed in FIG. 1, the pump A will displace less liquid but the pistons 2' of the motor B will displace a larger quantity of liquid per revolution of the rotor 11' so that the speed of the output shaft 14' decreases. By proper dimensioning of pistons 2, 2', the machine of my invention is capable of changing the torque and of changing the r.p.m. of the output shaft 14' within a desired range. A portion of each piston remains in the corresponding working chamber 3 or 3' even if the pistons are moved to their outer end positions. This is shown in the right-hand portion of FIG. 1 wherein the pistons 2' are held in their outer end positions.

FIG. 4 shows the bottom wall 5 in the same axial position as in FIG. 1. Thus, the pistons 2 penetrate all the way into the working chamber 3 and the penetration of pistons 2' into the working chamber 3' is proportionately less. The valve members 16, 16' close the outer sides of the corresponding working chambers. The arrow 22 indicates the direction in which the bottom wall 5 must move (in response to rotation of the shaft 10a) in order to reduce the axial length of the working chamber 3 which results in automatic increase in the axial length or depth of the working chamber 3'. The valve members 16, 16' do not share such axial movements of the bottom wall 5 because they abut or almost abut against the corresponding end faces of the mantle 1a. The same holds true for the spacer elements 9 which are fixed to the housing 1.

When the volume of the working chamber 3 changes in response to movement of the bottom wall 5 in a direction toward the valve member 16, the fluid will leak through unavoidable clearances between the bottom wall and the parts which are in contact therewith. However, if such clearances are minimal, the bottom wall 5 can only be shifted in response to exertion of a substantial force which is undesirable for obvious reasons, mainly because the adjustment in the axial position of the bottom wall could be effected rather slowly and by means of a strong motor which would have to drive the shaft 10a.

In order to facilitate axial displacements of the bottom wall 5, I provide suitable pressure-equalizing ducts 23 which allow the working chambers 3, 3' to communicate freely or with little resistance to the flow of liquid. Such ducts allow for direct communications between the working chambers and enable the liquid to escape from the working chamber 3 at the exact rate at which the volume of the working chamber 3' increases or vice versa. Consequently, the bottom wall 5 may be adjusted by exertion of a minimal force which contributes to accuracy of adjustment and to greater compactness of the machine. The pressures prevailing at the opposite sides of the bottom wall 5 are substantially identical so that there is no leakage between the chambers 3, 3' when the bottom wall is held in a selected axial position. This improves the efficiency of the machine.

In the embodiment of FIGS. 1 to 4, the pressure equalizing ducts 23 are machined into the bottom wall 5 and communicate with the recesses 5b for the spacer elements 9. However, it is clear that such ducts may be provided in another portion of the bottom wall or in another part of the machine as long as they allow for rapid flow of liquid between the working chambers 3, 3' when the operator decides to change the axial position of the bottom wall. However, care should be taken to distribute the ducts 23 in such a way that the distance between two adjoining ducts exceeds the distance between two adjoining pistons 2 or 2'; otherwise, the ducts would allow for communication of liquid between such sections of the working chamber 3 or 3' which are maintained at different pressures. Such short-circuiting would reduce the efficiency of the pump A or motor B. The efficiency of the machine is not affected adversely if a section of the working chamber 3 between a pair of pistons 2 communicates with the mirror symmetrical section of the working chamber 3' because such sections are maintained at identical or substantially identical pressure. This holds true even if the two rotors are driven at different speeds and in opposite directions.

The situation is the same for the pistons 2 which extend into the openings or spaces 24a, 24b, 24c between the teeth of the gear 6, see FIG. 2. The spaces 24a–24c are fully enclosed when the gear 6 assumes the angular position of FIG. 2. The base 8 is provided with ducts 25 which connect the spaces 24a–24c with the nearest spaces between the teeth of the gear 6'. The ducts 25 perform the same function as the ducts 23, i.e., they allow the liquid to flow between spaces which are maintained at identical or substantially identical pressure.

When the bottom wall 5 is shifted in the direction indicated by the arrow 22, the pistons 2 move toward the cover 13 against the bias of the spring 15. At the same time, the spring 15' is free to expand and causes the pistons 2' to follow the bottom wall 5. Such springs are satisfactory in many instances, but it can happen that the springs will be unable to shift the corresponding rotors if a part of the machine becomes stuck. Therefore, I prefer to provide a hydraulic system which assists or replaces the springs 15, 15' and serves to insure that the rotors 11, 11' and their pistone 2, 2' invariably follow axial movements of the bottom wall 5. The compartments 18, 18' are connected by a duct 26 in the mantle 1a so that the liquid which is expelled from the compartment 18 (when the bottom wall 5 moves in the direction indicated by the arrow 22) is free to flow into the compartment 18' by simultaneously compelling the rotor 11' to follow the bottom wall 5 and to move the pistons 2' deeper into the working chamber 3'. Such hydraulic system is much less prone to malfunction than the mechanical system including the springs 15, 15'.

The shaft 12 is lubricated by the liquid which leaks from the compartment 18 and enters the space 27 in the hub 13a as well as the space 28 in the base 8. The space 28 also receives fluid which leaks from the space 27 along the splines of the drive shaft 14 and through the interior of the hollow shaft 12. The space 28 communicates with a bore or passage 29, shown in FIG. 3, which discharges upwardly and into the reservoir 20. Thus, liquid which leaks from the compartment 18 returns into the reservoir 20 and is recirculated through the machine via suction channel 19a. As a rule, the level 30 of liquid in the reservoir 20 is higher than the level of chambers, compartments and spaces in the pump A and motor B to make sure that the two units of my machine remain filled with liquid even if the machine is idle. In other words, the machine is always ready for immediate operation. Furthermore, such mounting of the reservoir 20 reduces the area of contact between oil and air which is highly desirable.

In accordance with a further feature of my invention, the operation and efficiency of the machine will be improved if the interior of the reservoir 20 is maintained at superatmospheric pressure. This enables the machine to operate at higher rotational speeds and with a greater efficiency without any danger of cavitation which is a phenomenon that should be avoided in all types of hydrostatic transmission. Many presently known hydrostatic machines must be provided with specially designed auxiliary pumps which feed oil at an elevated pressure to avoid cavitation. Such auxiliary pumps consume additional energy and reduce the efficiency of the machine.

The static pressure in the reservoir 20 may be increased by introducing therein a requisite supply of liquid pressure medium which rises to a level 30 and by filling the remainder of the reservoir with a cushion of compressed air or another suitable gas.

Figure 5:
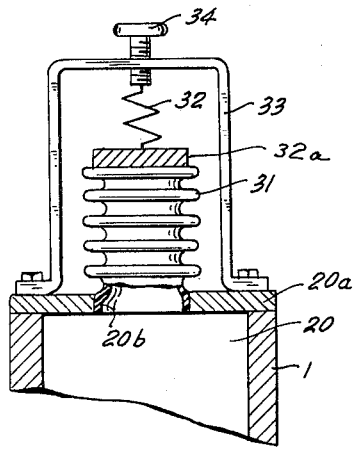
FIG. 5 is a fragmentary partly elevational and partly sectional view of a slightly modified hydrostatic machine.

Alternatively, the machine may be equipped with an adjustable pressure regulating device one form of which is shown in FIG. 5. This device comprises a bellows 31 which communicates with the interior of the reservoir 20. The lid 20a of the reservoir is provided with an aperture 20b which leads into the bellows 31, and the latter is completely filled with a liquid pressure medium. Thus, the liquid rises to the top wall of the bellows 31 which is biased by a helical spring 32 acting against a pressure transmitting plate 32a. The bias of the spring 32 may be adjusted by a regulating screw 34 which is threaded into a U-shaped yoke 33 secured to the lid 20a. The bias of the spring 32 will determine the pressure in the suction channel 19a. The spring 32 can compensate for such changes in volume of entrapped liquid which are due to temperature changes. The same applies for the aforementioned cushion of compressed gas above the liquid level 30 in the reservoir 20 shown in FIG. 3.

An important advantage of the machine shown in FIG. 5 is that the reservoir 20 may be located at a level below the pump A and motor B. Also, the reservoir 20 of FIG. 5 may be made smaller because it need not accommodate a cushion of compressed gas, and the entrapped liquid need not come in contact with any gaseous fluids. The bellows 31 can be considered to constitute a deformable wall portion of the reservoir 20.

The pressures which prevail in the compartments 18, 18' depend from the operating pressures in the pump A and motor B. Even though the high pressure channel 19 is relatively short, some drop in pressure will be observable and such drop will result in a pressure differential between the interior of the pump A and motor B. This would result in a pressure differential between the compartments 18, 18' since these compartments respectively communicate with the working chambers 3, 3' through the annular gaps 35, 35'. By suitable adjustments in the width of the gaps 35, 35', the pressure in the compartment 18 may be made to equal the pressure in the compartment 18'. This can be achieved by proper dimensioning of surfaces which surround the gaps 35, 35' and/or by the provision of a throttling zone in the bore 26 which connects the compartments 18, 18' to each other.

The outer diameter of the right-hand portion 36 of the hollow shaft 12 is greater than the outer diameter of the shaft portion 36a. The shaft portion 36 rotates in the bore 7a of the fixed shaft 7 for the gear 6, and the shaft portion 36a rotates in the hub 13a. The pressure prevailing in the compartment 18 tends to move the rotor 11 toward the central symmetry plane of the machine. This symmetary plane coincides with the section line III—III of FIG. 1. Owing to such pressure upon the outer side of the rotor 11, the end faces of the pistons 2 are held in sealing engagement with the adjacent side of the bottom wall 5. Thus, the pressure between the pistons 2 and bottom wall 5 rises proportionally with rising pressure in the compartment 18 and, since such pressure is proportional to the pressure in the working chamber 3 (due to the provision of the gap 35), the force with which the pistons 2 bear against the bottom wall 5 is proportional to the working pressure of the pump A. The same holds true for the motor B. The springs 15, 15' are strong enough to keep the end faces of the pistons 2, 2' in abutment with the corresponding sides of the bottom wall 5 when the machine is at a standstill or when the machine is idling.

Referring again to FIG. 4, the arrow 37 indicates the direction in which the liquid will act against the bottom wall 5 when the pump A is in actual use. The surface 38 of the bottom wall then bears against the corresponding spacer element 9 and the latter prevents angular displacements of the bottom wall 5. When the pinion 10 rotates to change the axial position of the bottom wall, the surface 38 slides along the corresponding spacer element. It will be noted that the spacer elements 9 are shorter than the recesses 5b so that the liquid may flow, with minimal hindrance, from the ducts 23 in the detachable portion 5a and into the ducts 23 in the remainder of the bottom wall 5, or vice versa.

The collars 39, 39' on the shafts 14, 14' form fluid-tight seals to prevent escape of liquid or gas from the interior of the housing. These collars are provided at the outer ends of the spaces 27, 27'.

Figure 6:
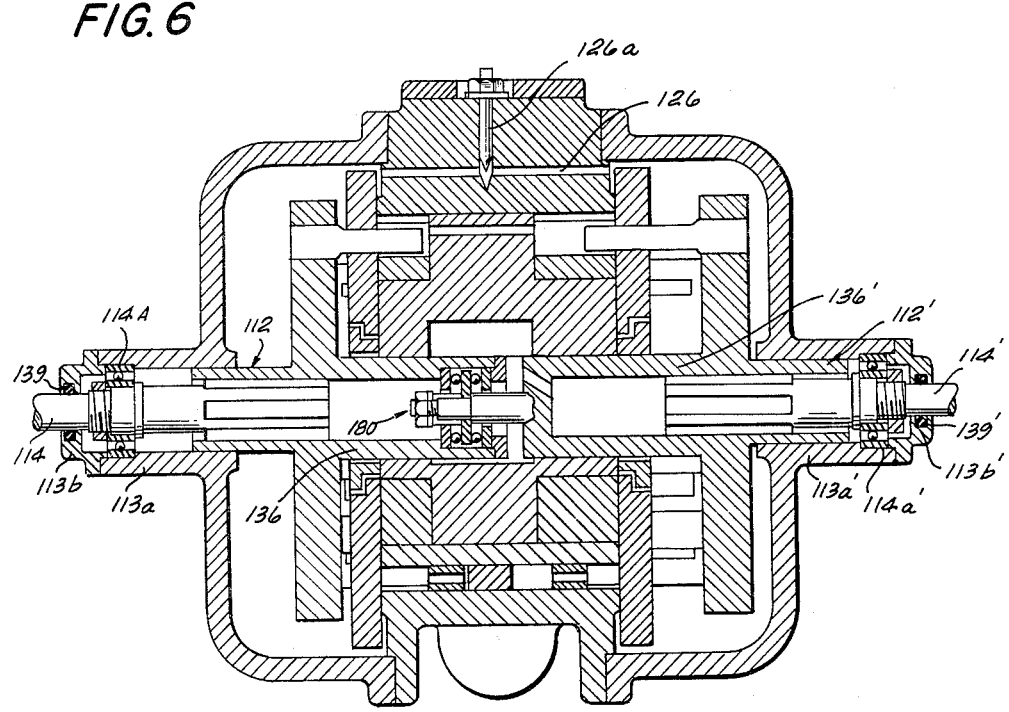
FIG. 6 is an axial section through a third hydrostatic machine.

FIG. 6 shows a hydrostatic machine wherein the inner end portions 136, 136' of the shafts 112, 112' are attached to each other by a thrust bearing 180 which allows these shafts to rotate in opposite directions when the machine is in use. The bearing 180 holds the end portions 136, 136' against axial movement with reference to each other. The springs 15, 15' are omitted and the collars 39, 39' are replaced by sealing rings 139, 139' of rubber or the like which are recessed into detachable portions 113b, 113b' of the hubs 113a, 113a'. The shafts 114, 114' are mounted in radial antifriction bearings 114A, 114A'. Such bearings can take up some axial stresses.

The flow of hydraulic fluid through the bore 126 is controlled by a needle valve 126a which may be adjusted by a screwdriver or the like.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a variable speed hydrostatic machine, a single housing, and a pair of mirror symmetrical internal-gear-type rotary pumps one of which functions as a motor and is driven by the other thereof, said pumps being mounted in and each thereof defining with said housing an arcuate working chamber, each pump having an axially movable rotor provided with a plurality of pistons extending into and arranged to orbit in the corresponding working chamber.

2. In a variable-speed hydrostatic transmission a single housing; and a pair of mirror symmetrical internal-gear-type pumps one of which functions as a motor and is driven by the other thereof, said pumps being mounted in and each thereof defining with said housing an arcuate working chamber, each pump having an axially movable rotor provided with a plurality of pistons extending into and arranged to orbit in the corresponding working chamber, and a common bottom wall provided intermediate said chambers and movable axially of said rotors to increase the volume of one chamber at the expense of the other chamber or vice versa.

3. In a variable-speed hydrostatic transmission, a single housing; and a pair of mirror symmetrical internal-gear-type pumps one of which functions as a motor and is driven by the other thereof, said pumps being mounted in and each thereof defining with said housing an arcuate working chamber, each pump having an axially movable rotor provided with a plurality of pistons extending into and arranged to orbit in the corresponding working chamber, and a common bottom wall provided intermediate said chambers and movable axially of said rotors to increase the volume of one chamber at the expense of the other chamber or vice versa, said transmission being provided with pressure equalizing duct means connecting said working chambers to facilitate communication of a liquid pressure medium between said chambers in response to axial movement of said bottom wall.

4. In a variable-speed hydrostatic transmission, a single housing; and a pair of mirror symmetrical internal-gear-type pumps one of which functions as a motor and is driven by the other thereof, said pumps being mounted in and each thereof defining with said housing an arcuate working chamber, each pump having an axially movable rotor provided with a plurality of pistons extending into and arranged to orbit in the corresponding working chamber, and a common bottom wall provided intermediate said chambers and movable axially of and together with said rotors to increase the volume of one chamber at the expense of the other chamber or vice versa.

5. In a variable speed hydrostatic transmission, a single housing; and a pair of mirror symmetrical internal-gear-type pumps one of which functions as a motor and is driven by the other thereof, said pumps being mounted in and each thereof defining with said housing a liquid-filled compartment and an arcuate liquid-filled working chamber substantially sealed from the respective compartment, each working chamber having a liquid-receiving portion and a spaced liquid-discharging portion and said housing being provided with a pair of channels each connecting one of said liquid-receiving portions to one of said liquid-discharging portions, each pump comprising an axially movable rotor having pistons extending into and arranged to orbit in the respective working chamber to convey the liquid therethrough, and a bottom wall provided between said chambers and movable axially of together with said rotors to increase the volume of one of said working chambers at the expense of the other chamber or vice versa.

6. In a variable speed hydrostatic transmission, a single housing; and a pair of mirror symmetrical internal-gear-type pumps one of which functions as a motor and is driven by the other thereof, said pumps being mounted in and each thereof defining with said housing a liquid-filled compartment and an arcuate liquid-filled working chamber substantially sealed from the respective compartment, each working chamber having a liquid-receiving portion and a spaced liquid-discharging portion and said housing being provided with a pair of channels each connecting one of said liquid-receiving portions to one of said liquid-discharging portions and with pressure equalizing duct means connecting said compartments to each other, each pump comprising an axially movable rotor having pistons extending into and arranged to orbit in the respective working chamber to convey the liquid therethrough, and a bottom wall provided beween said chambers and movable axially of and together with said rotors to increase the volume of one of said working chambers at the expense of the other chamber or vice versa.

7. In a variable speed hydrostatic transmission, a single housing; and a pair of mirror symmetrical internal-gear-type pumps one of which functions as a motor and is driven by the other thereof, said pumps being mounted in and each thereof defining with said housing a liquid-filled compartment and an arcuate liquid-filled working chamber substantially sealed from the respective compartment, each working chamber having a liquid-receiving portion and a spaced liquid-discharging portion and said housing being provided with a pair of channels each connecting one of said liquid-receiving portions to one of said liquid-discharging portions, each pump comprising an axially movable rotor having pistons extending into and arranged to orbit in the respective working chamber to convey the liquid therethrough, and a bottom wall provided between said chambers and movable axially of and together with said rotors to increase the volume of one of said working chambers at the expense of the other chamber or vice versa, said housing further comprising a source of liquid pressure medium communicating with one of said channels and containing a supply of liquid whose level is located above said compartments and said working chambers so that said pumps are filled at all times.

8. A structure as set forth in claim 7, wherein said source is a reservoir which contains a cushion of compressed gas above the liquid level therein so that the liquid in said pumps is subjected to initial compression.

9. A structure as set forth in claim 7, further comprising an upwardly extending passage provided in said housing to return into said source any liquid leaking from said compartments.

10. In a variable speed hydrostatic transmission, a single housing; and a pair of mirror symmetrical internal-gear-type pumps one of which functions as a motor and is driven by the other thereof, said pumps being mounted in and each thereof defining with said housing a liquid-filled compartment and an arcuate liquid-filled working chamber substantially sealed from the respective compartment, each working chamber having a liquid-receiving portion and a spaced liquid-discharging portion and said housing being provided with a pair of channels each connecting one of said liquid-receiving portions to one of said liquid-discharging portions, each pump comprising an axially movable rotor having pistons extending into and arranged to orbit in the respective working chamber to convey the liquid therethrough, and a bottom wall provided between said chambers and movable axially of and together with said rotors to increase the volume of one of said working chambers at the expense of the other chamber or vice versa, said housing further comprising a liquid-filled reservoir communicating with one of said channels, said reservoir having a deformable wall portion and comprising means for biasing said deformable wall portion so as to subject the liquid to initial compression.

11. A structure as set forth in claim 10, wherein said deformable wall portion is a bellows and wherein said biasing means comprises a resilient element which bears against said bellows.

12. A structure as set forth in claim 11, further comprising means for regulating the bias of said resilient element.

13. In a variable speed hydrostatic transmission, a single housing; a pair of mirror symmetrical internal-gear-type rotary pumps one of which functions as a motor and is driven by the other thereof, said pumps being mounted in and each thereof defining with said housing an arcuate liquid-filled working chamber, each pump having an axially movable rotor member provided with a plurality of pistons extending into and arranged to orbit in the respective working chamber, and a common bottom wall member disposed between said pistons and movable axially of and with said rotor members to increase the volume of one working chamber at the expense of the other working chamber or vice versa; adjusting means operatively connected with one of said members for moving all of said members axially with reference to said housing; input means operatively connected with and arranged to drive the rotor member of said other pump; and output means operatively connected to and arranged to be driven by the rotor member of said one pump.

14. In a variable speed hydrostatic transmission, a single housing; a pair of mirror symmetrical internal-gear-type rotary pumps one of which functions as a motor and is driven by the other thereof, said pumps being mounted in and each thereof defining with said housing an arcuate liquid-filled working chamber, each pump having an axially movable rotor member provided with a plurality of pistons extending into and arranged to orbit in the respective working chamber, and a common bottom wall member disposed between said pistons and movable axially of and with said rotor members to increase the volume of one working chamber at the expense of the other working chamber or vice versa; means for biasing the pistons of said rotor members against the opposite sides of said bottom wall so that all of said members are movable as a unit; adjusting means operatively connected with one of said members for moving all of said members axially with reference to said housing; input means operatively connected with and arranged to drive the rotor member of said other pump; and output means operatively connected to and arranged to be driven by the rotor member of said one pump.

15. A structure as set forth in claim 14, wherein said housing and said rotor members define between themselves a pair of liquid-filled compartments and wherein each of said pumps comprises valve means partially sealing said working chambers from the respective compartments so that the pressure prevailing in said compartments approximates the pressure in the respective working chambers, the liquid in said compartments being utilized to bias the pistons against said bottom wall.

16. A structure as set forth in claim 15, wherein the means for biasing said pistons further comprises springs interposed between said input and output means and the respective rotor members.

17. In a variable speed hydrostatic transmission, a single housing; a pair of mirror symmetrical internal-gear-type rotary pumps one of which functions as a motor and is driven by the other thereof, said pumps being mounted in and each thereof defining with said housing an arcuate liquid-filled working chamber, each pump having an axially movable rotor member provided with a plurality of pistons extending into and arranged to orbit in the respective working chamber, and a common bottom wall member disposed between said pistons and movable axially of and with said rotor members to increase the volume of one working chamber at the expense of the other working chamber or vice versa, said bottom wall member having axially extending pressure equalizing ducts connecting said working chambers; adjusting means operatively connected with one of said members for moving all of said members axially with reference to said housing; input means operatively connected with and arranged to drive the rotor member of said other pump; and output means operatively connected to and arranged to be driven by the rotor member of said one pump.

18. A structure as set forth in claim 17, wherein said bottom wall member is provided with a recess and said housing comprises spacer means extending into said recess to hold the bottom wall member against rotation in said housing.

19. In a variable speed hydrostatic transmission, a single housing; a pair of mirror symmetrical internal-gear-type rotary pumps one of which functions as a motor and is driven by the other thereof, said pumps being mounted in and each thereof defining with said housing an arcuate liquid-filled working chamber, each pump having an axially movable rotor member provided with a plurality of pistons extending into and arranged to orbit in the respective working chamber, said rotor members being arranged to rotate in opposite directions and each thereof comprising the same number of pistons, and a common bottom wall member disposed between said pistons and movable axially of and with said rotor members to increase the volume of one working chamber at the expense of the other working chamber or vice versa; adjusting means operatively connected with one of said members for moving all of said members axially with reference to said housing; input means operatively connected with and arranged to drive the rotor member of said other pump; and output means operatively connected to and arranged to be driven by the rotor member of said one pump.

20. In a variable speed hydrostatic transmission, a single housing; a pair of mirror symmetrical internal-gear-type rotary pumps one of which functions as a motor and is driven by the other thereof, said pumps being mounted in and each thereof defining with said housing an arcuate liquid-filled working chamber, each of said chambers having a liquid-receiving portion and a liquid-discharging portion distant from the respective liquid-receiving portion, said housing having a pair of channels each of which connects the liquid-receiving portion of one chamber with the liquid-discharging portion of the other chamber, each pump having an axially movable rotor member provided with a plurality of pistons extending into and arranged to orbit in the respective working chamber so as to convey liquid from the liquid-receiving to the liquid-discharging portion of the respective chamber, and a common bottom wall member disposed between said pistons and movable axially of and with said rotor members to increase the volume of one working chamber at the expense of the other working chamber or vice versa; adjusting means operatively connected with one of said members for moving all of said members axially with reference to said housing; input means operatively connected with and arranged to drive the rotor member of said other pump; output means operatively connected to and arranged to be driven by the rotor member of said one pump; and a liquid reservoir connected with the liquid-discharging portion of the working chamber in said one pump.

References Cited by the Examiner
UNITED STATES PATENTS 1,276,372  8/1918  Johnson _____ 103—120
1,994,397  3/1935  Loveridge et al. _____ 91—68 X
2,979,036  4/1961  Noren _____ 91—68

EDGAR W. GEOGHEGAN, *Primary Examiner.*